July 5, 1966 H. CLOVER 3,259,133
DOUBLE LAYER FOUNDATION GARMENT
Filed June 1, 1964 6 Sheets-Sheet 1
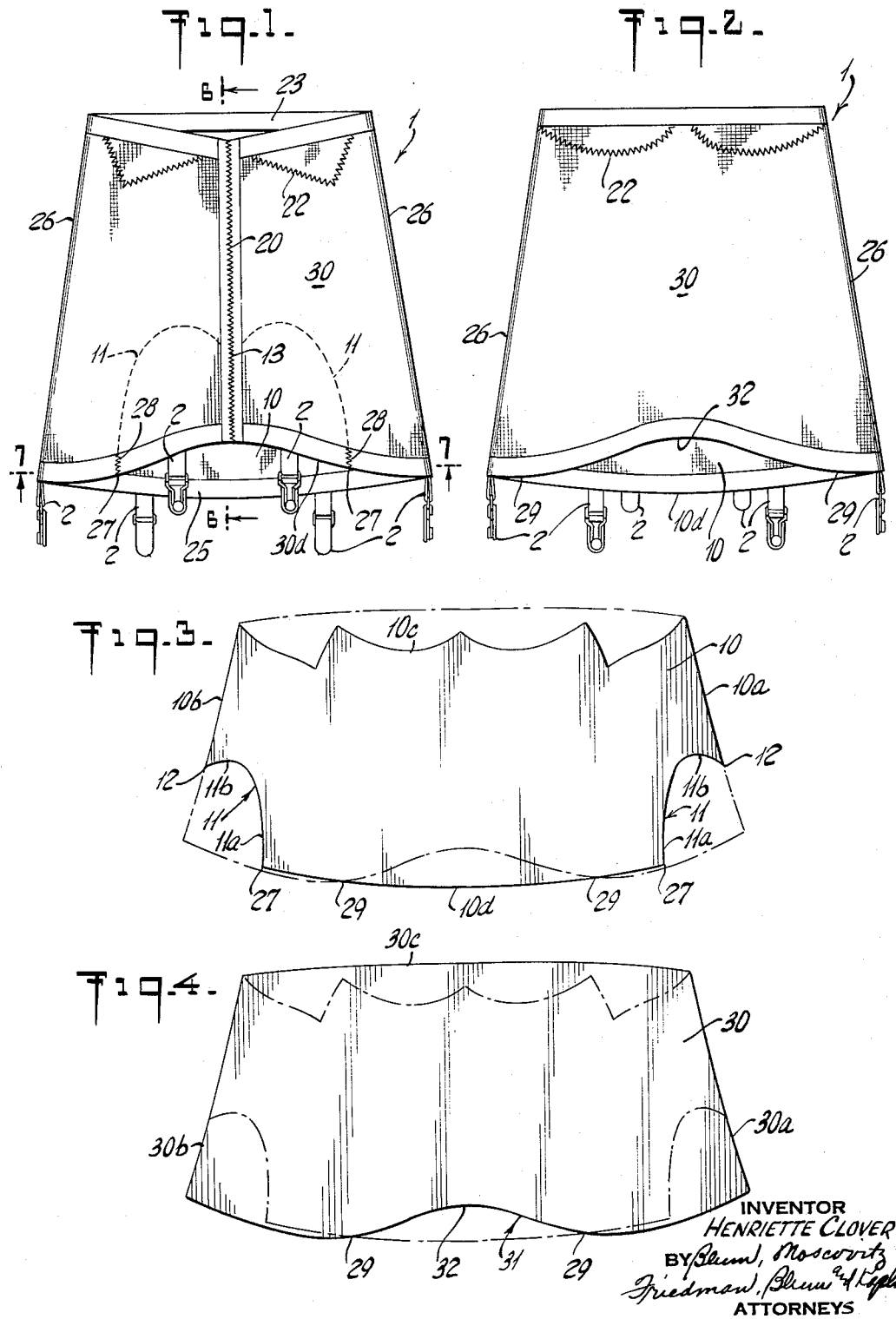

July 5, 1966 H. CLOVER 3,259,133
DOUBLE LAYER FOUNDATION GARMENT
Filed June 1, 1964 6 Sheets-Sheet 2
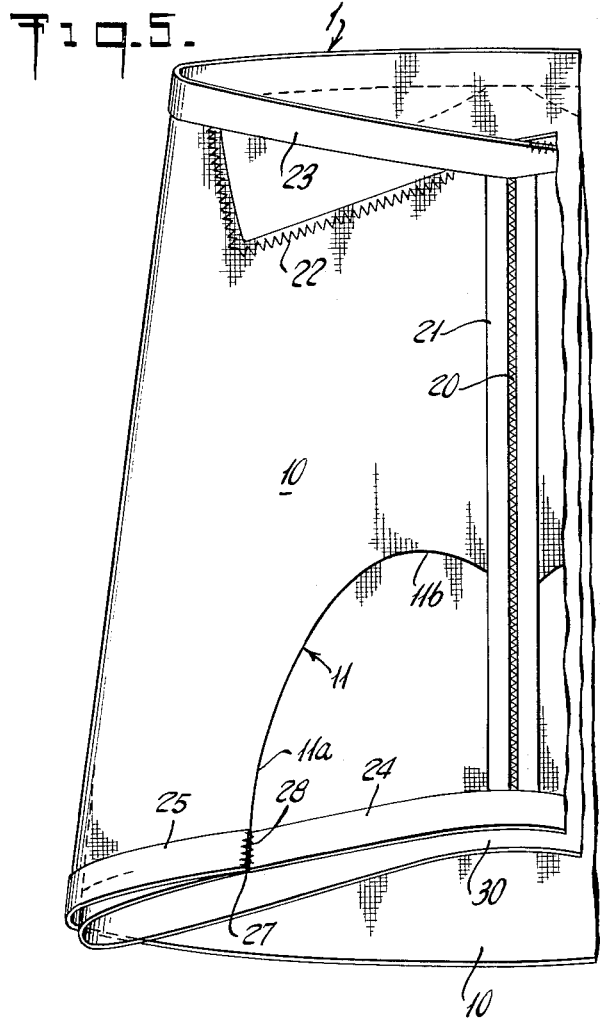
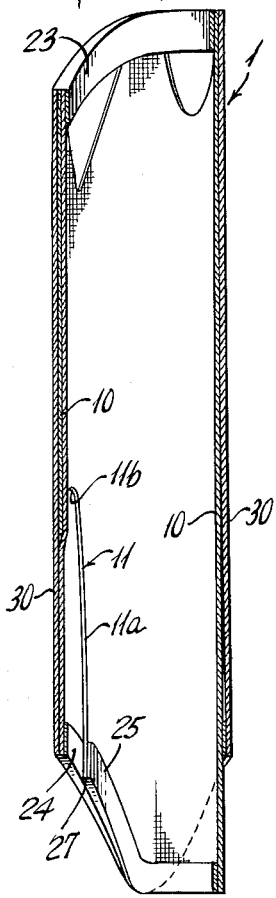
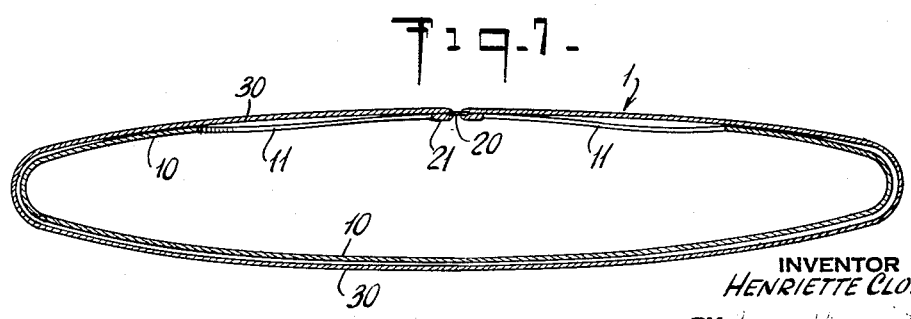
INVENTOR
HENRIETTE CLOVER
ATTORNEYS July 5, 1966 H. CLOVER 3,259,133
DOUBLE LAYER FOUNDATION GARMENT
Filed June 1, 1964 6 Sheets-Sheet 3
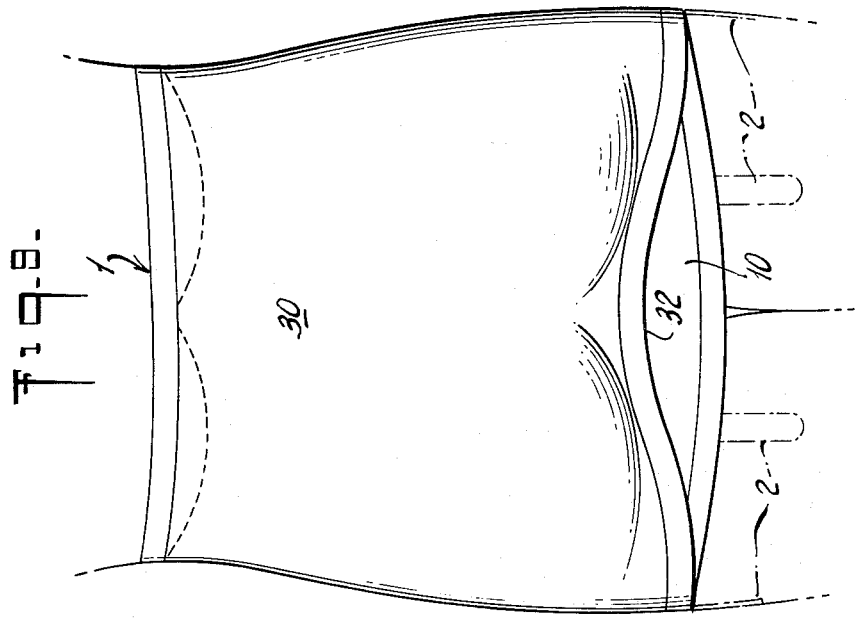
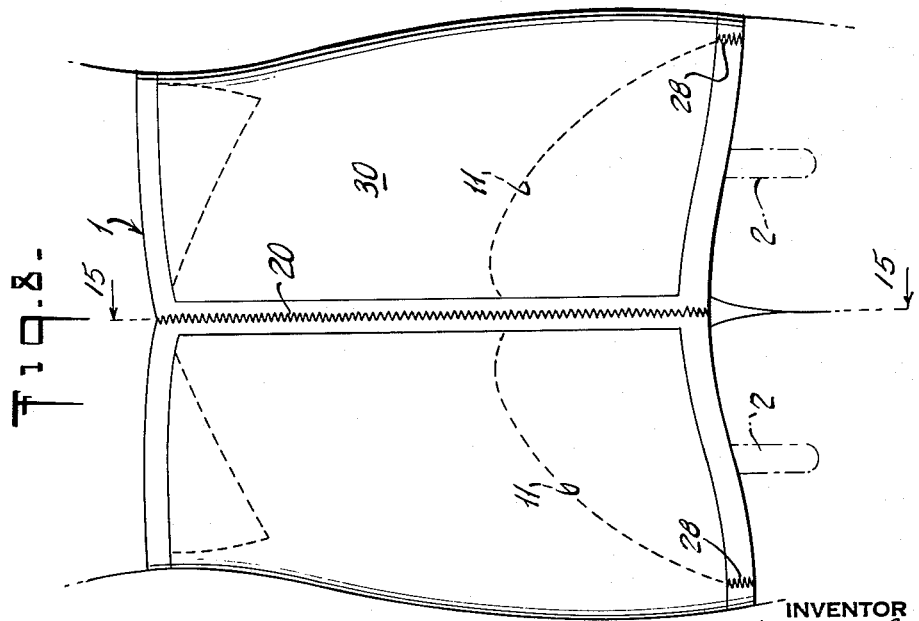
INVENTOR
HENRIETTE CLOVER
BY
ATTORNEYS

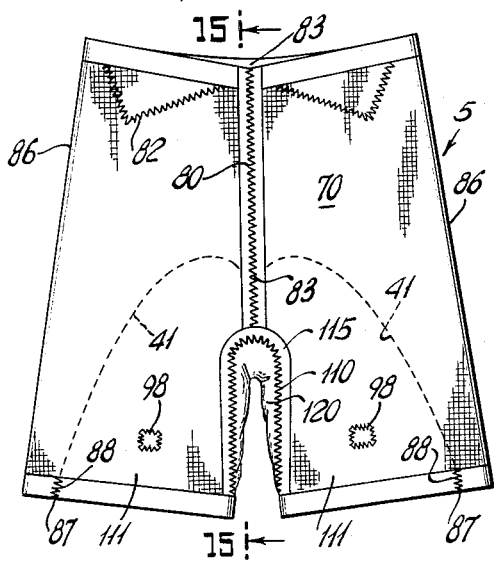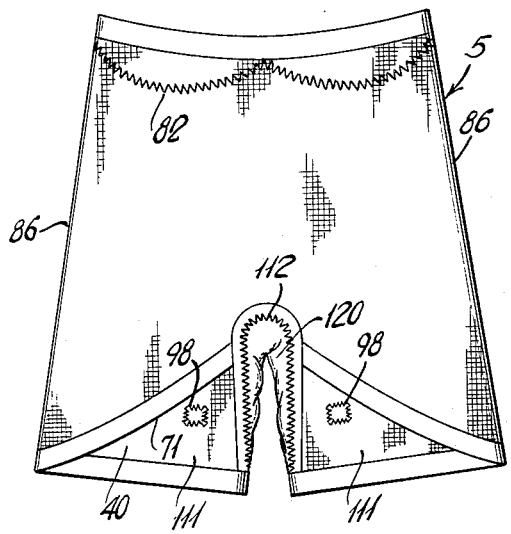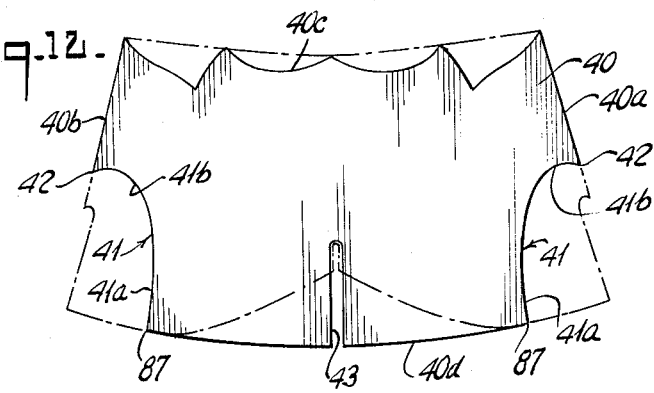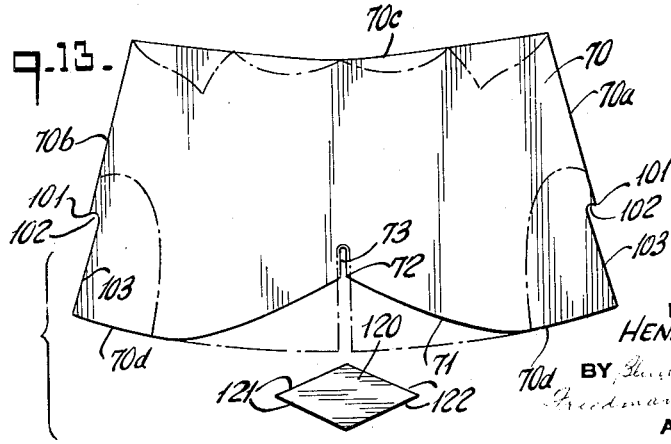

July 5, 1966 H. CLOVER 3,259,133
DOUBLE LAYER FOUNDATION GARMENT
Filed June 1, 1964 6 Sheets-Sheet 5

INVENTOR
HENRIETTE CLOVER
BY
ATTORNEYS

July 5, 1966  H. CLOVER  3,259,133
DOUBLE LAYER FOUNDATION GARMENT
Filed June 1, 1964  6 Sheets-Sheet 6
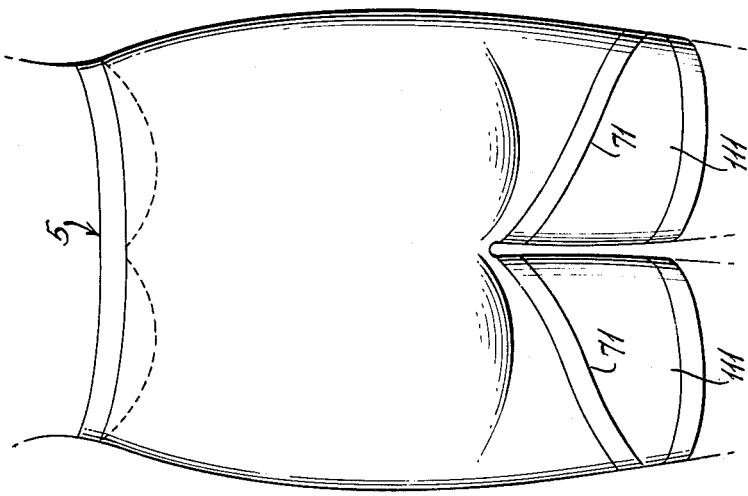
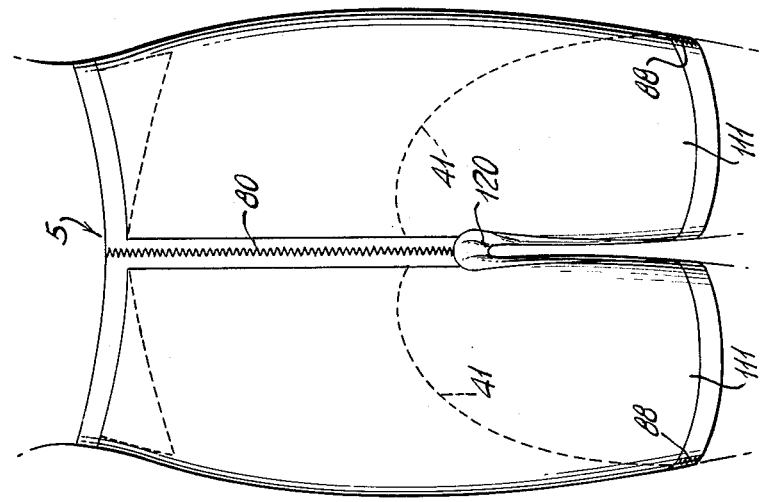
INVENTOR
HENRIETTE CLOVER
ATTORNEYS

United States Patent Office 3,259,133
Patented July 5, 1966

3,259,133
DOUBLE LAYER FOUNDATION GARMENT
Henriette Clover, Flushing, N.Y., assignor to Van Raalte Company, Inc., New York, N.Y., a corporation of New York
Filed June 1, 1964, Ser. No. 371,418
5 Claims. (Cl. 128—552)

This invention relates to foundation garments, especially girdles and panty girdles, and more particularly to double bodied foundation garments consisting of two separately and independently functioning body-encircling portions.

One object of the invention is to provide a foundation garment, such as a girdle or panty girdle, having inner and outer body-encircling portions of two-way stretch fabric, of construction such that the garment gives increased support to the abdomen and buttocks of the wearer.

Another object of the invention is to provide a panty girdle of the above-described type, which is comfortable to wear both in sitting and in walking.

Another object of the invention is to provide a foundation garment of the above-described type, the support portions of which can be made from two blanks of fabric, without the need for special inserts in either of the blanks.

In accordance with preferred embodiments of the invention, I provide a foundation garment of two-way stretch material comprising an outer body-encircling portion superposed upon an inner body-encircling portion. These body-encircling portions are joined to each other along their vertical edges to form a seam, preferably a front seam. The upper ends of the body-encircling portions are anchored together, as by stitching them together around the entire periphery of the garment.

Further in accordance with the preferred embodiments of the invention, the lower edge of the outer body-encircling portion is upwardly shallowly concave in the rear of the garment and there extends above the rear lower edge of the inner body-encircling portion so as to be positioned, shaped and proportioned to be located supportingly against the bottom of the buttocks. The lower edges of the body-encircling portions or panels register and are secured together, as by stitching, at respective points intermediate the front center and the sides of the garment, and are otherwise free of each other for at least the greater part of their length. Further in accordance with the invention, the inner body-encircling portion has an edge which extends upwardly from each such point and then curves concavely until meeting the front seam. As a result, the edge of the inner body-encircling portion between the aforesaid points is positioned, shaped and proportioned to extend supportingly over and against the abdomen. The front hose supporters are attached to the outer body-encircling portion or panel. The rear hose supporters are attached to the inner body-encircling portion or panel.

Among the advantages of the construction, the outer body-encircling portion is shaped at the rear so as to provide the desired buttocks support. On the other hand, inner body-encircling panel is shaped, intermediate the two anchoring points, for the desired support of the abdomen. In conventional garments, it is necessary to provide a single body-encircling portion which supports both the abdomen and the buttocks, and this has required all sorts of elaborate expedients of special insert panels, cut on the bias or if inelastic material and in any event involving additional labor and often detrimental to the appearance of the garment.

As another advantage of the invention, the hose supporters are attached to parts of the garment which do not serve as the main controls or supports for the abdomen and buttocks.

As another advantage of the invention, it lends itself to both girdle and panty girdle embodiment, with the latter embodiment providing particular comfort both in sitting and in walking.

The foregoing construction lends itself particularly well to adaptation to a panty girdle, wherein the outer body-encircling portion provides the front leg panels, and the inner body-encircling portion provides the rear leg panels. These leg panels are secured together in order to provide the required leg encircling portions. In view of the manner in which the lower edges of the body-encircling portions are secured together, as referred to above, this panty girdle provides the necessary support functions, while at the same time insuring unusual freedom for both walking and sitting.

Other objects and advantages of the invention will become apparent from tthe following description, in conjunction with the annexed drawings, in which preferred embodiments of the invention are disclosed.

In the drawings,

FIGS. 1–9 show a girdle embodiment of the invention.

FIG. 1 is a front elevational view of the garment in accordance with this embodiment of the invention.

FIG. 2 is a rear elevational view of the garment.

FIG. 3 is a plan view of the blanks for the respective inner and outer body-encircling portions, shown superposed preparatory to stitching, the inner body-encircling portion being shown in full lines and the outer body-encircling portion being shown in broken lines.

FIG. 4 is a view similar to FIG. 3, except that in FIG. 4, the outer body-encircling portion is shown in full lines and the inner body-encircling portion is shown in broken lines.

FIG. 5 is a fragmentary perspective view of the garment, shown inside out.

FIG. 6 is a section on line 6—6 of FIG. 1.

FIG. 7 is a section on line 7—7 of FIG. 1.

FIG. 8 is a front elevation of the garment on a wearer.

FIG. 9 is a rear elevation of the garment on a wearer.

FIGS. 10–18 show a pantry girdle embodiment of the invention.

FIG. 10 is a front elevational view of the garment in accordance with this embodiment.

FIG. 11 is a rear elevational view of the garment.

FIG. 12 is a plan view of the blanks for the respective outer and inner body-encircling portions of the garment, shown superposed preparatory for stitching, the inner body-encircling portion being shown in full lines and the outer body-encircling portion being shown in broken lines.

FIG. 13 is an exploded view similar to FIG. 10, the blank for the crotch being added, the outer body-encircling portion being shown in full lines, the inner body-encirling portion being shown in broken lines.

FIG. 14 is a fragmentary perspective view of the garment, shown inside out.

FIG. 15 is a section on line 15—15 of FIG. 8.

FIG. 16 is a bottom plan view of the garment.

FIG. 17 is a front elevation of the garment on a wearer.

FIG. 18 is a rear elevation of the garment on a wearer.

Figure 14:
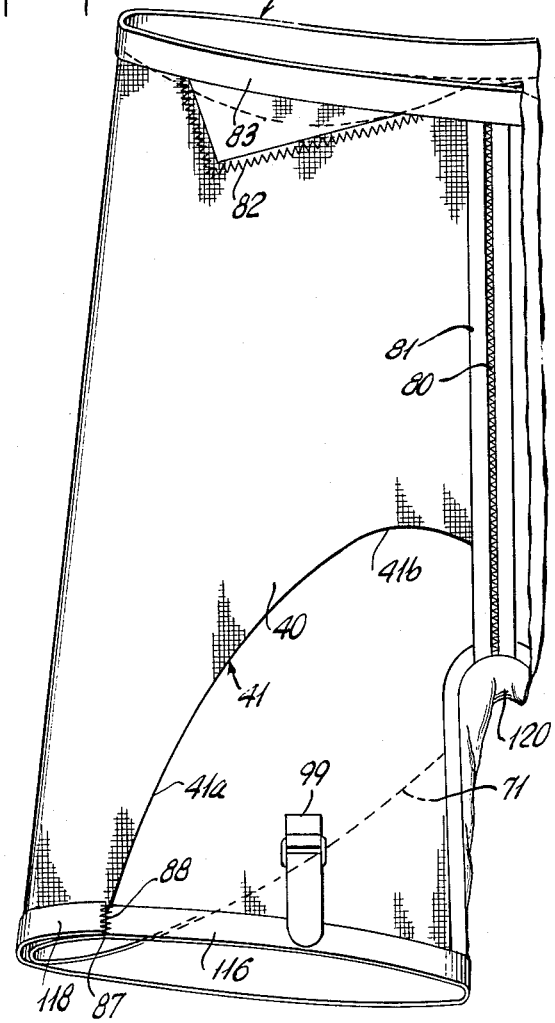
Figure 15:
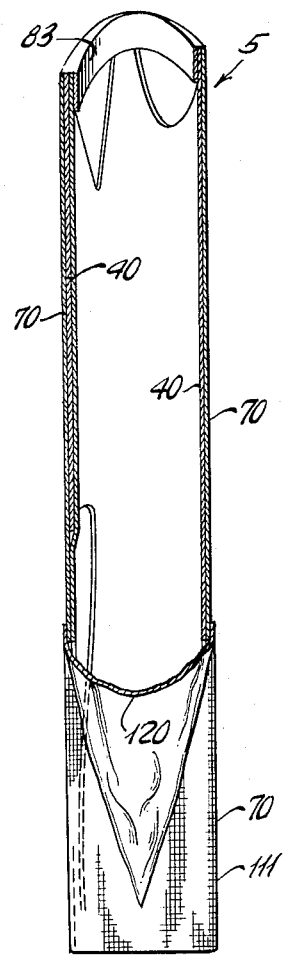
Figure 16:
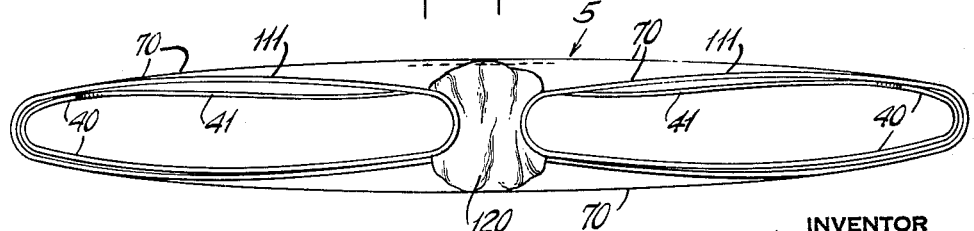

The drawings are substantially to scale of actual models of the garments in accordance with the respective embodiments, and reference is made to the drawings to complete the disclosure herein.

First embodiment

In this embodiment, the foundation garment is in the form of a girdle 1 having an inner body-encircling portion 10 and an outer body-encircling portion 30. These portions are made of any suitable conventional two-way stretch material.

As shown in FIGS. 3 and 4, the inner and outer body-encircling portions 10 and 30 are formed from blanks of substantially the same overall configuration and shape. That is, when the two blanks are superposed, as shown in these views, their downwardly, outwardly inclined side edges, which may be considered to extend generally vertically, are in registration. In other words, the vertical edge 10a of the blank of body-encircling portion 10 registers with the corresponding edge 30a of the blank of body-encircling portion 30. Similarly, the other vertical edge 10b of the blank of body-encircling portion 10 registers with the other vertical edge 30b of the blank of body-encircling portion 30. In order to form the garment, the edges 10a and 30a on the one hand, and 10b and 30b on the other hand, are brought together at the front of the garment and stitched together along their entire length to form a front seam 20. Without detailed showing, it will be apparent that the fabric edges on either side of the seam may be reinforced as shown somewhat diagrammatically at 21 in FIG. 5. In blank form, the upper ends of edges 10a and 30a coincide, and the upper ends of edges 10b and 30b coincide. However, the upper edge 10c of the inner panel or body-encircling portion 10 is located below the level of the upper edge 30c of the outer body-encircling portion or panel 30.

Accordingly, this relationship applies in the stitched form of the garment shown in FIGS. 1 and 2. That is, the edge 10c is cut out, to any suitable shape such as that shown in FIG. 3, to produce any suitable decorative effect when secured by stitching 22 to the outer panel or body-encircling portion 30. The upper end of the outer body-encircling portion 30 may be reinforced on its inner face by band 23 (FIG. 5).

Similarly, the lower end of outer panel or body-encircling portion 30 may be reinforced on its inner face by band 24, and the lower edge of inner panel or body-encircling portion 10 may be reinforced on its inner face by band 25. These reinforcing bands are conventional and are not shown in detail.

For convenience, the side edges 26 shown in the flattened condition of the garment, with seam 20 centered on the rear of the garment, will be defined as the side edges of garment 1. These edges 26 are downwardly, outwardly divergent in the usual manner.

At the front of the garment, the bottom edge 10d of the inner panel or body-encircling portion 10 terminates, intermediate the side edges 26 and the central front seam 20, at respective points 27. However, the bottom edge 30d of outer panel or body-encircling portion 30 extends fairly straight across the front of the garment, from each point 27, to the bottom of seam 20. The bottom edges 10d and 30d are secured together by stitching 28 at the points 27, said bottom edges being otherwise completely free of each other.

From each point 27, inner panel or body-encircling portion 10 has an arcuate edge 11 which extends generally upwardly to the points 12 which are the bottom ends of the respective edges 10a and 10b. These edges 11, accordingly, connect with the front seam 20 at a level approximately at the point marked 13, located considerably above the bottom end of seam 20. More specifically, each such edge 11 is concave and has a lower portion 11a which extends generally upwardly from point 27. The edge portion 11a is very shallowly, outwardly concave, and merges smoothly at its upper end with an edge portion 11b which is downwardly concave with a such smaller radius of curvature than the edge portion 11a. The edge portion 11b extends to the point 12. As will be discussed in somewhat more detail below, when the garment 1 is worn, the edge 30d extends generally below the level of support of the abdomen, while the two edges 11 extend supportingly across the abdomen.

At the rear of garment 1, the lower edge 10d of inner panel or body-encircling portion 10 extends generally straight across the rear of the wearer. The lower edge 30d of the outer panel or body-encircling portion 30 approximately coincides with edge 10d in the side zones of the garment, extending from the respective points 27 outwardly around the side edges 26 and to points 29 in the rear of the garment. Between the points 29, the edge 30d has a portion 31 which is scooped and generally concave. The upper point 32 of the edge 31, located at the rear center of garment 1, is located well above the edge 10d. This scooped portion is relatively shallow. However, as will be explained in more detail below, when garment 1 is worn, the edge 10d is located generally below the zone of effective buttocks support while the edge 31 is positioned to press supportingly against the lower part of the buttocks.

The garment is completed by conventional hose supporters 2, six such hose supporters 2 being shown. These hose supporters 2 are suspended from the bottoms of the panels 10 and 30. Specifically, two hose supporters 2 are suspended from the bottom edge 30d at the front of garment 1, on either side of the front seam 20. Two further hose supporters 2 are suspended from the bottom edge 30d of the outer panel or body-encircling portion 30 substantially in line with the garment side edges 26. Two further hose supporters 2 are suspended from the bottom edge 10c of the inner panel or body-encircling portion 10, at the rear of the garment, slightly outwardly of the front hose supporters 2. Put in other terms, at the rear of the garment, where the special buttocks support is provided by the edge portion 32 of the outer panel 30, the hose supporters 2 are secured to the inner panel or body-encircling portion 10. Conversely, at the front of the garment, where the main abdomen support function is accomplished by the edge portions 11 of the inner panel or body-encircling portion 10, the hose supporters 2 are secured to the outer panel or body-encircling portion 30. The placement of the two side hose supporters 2 is such as not to interfere with the support function of the edge portion 32 of the outer panel or body-encircling portion 30.

The hose supporters 2 are conventional, and are conventionally secured to the panels and to the bands 24 and 25, so that extended showing of the stitching of the hose supporters to the garment is unnecessary, and extended description of the hose supporters themselves is also not required.

From the foregoing, it will be apparent that I have provided a foundation garment 1 of two-way stretch material comprising an outer body-encircling portion 30 superposed upon an inner body-encircling portion 10, these body-encircling portions 10 and 30, along the vertical edges 10a, 10b and 30a, 30b, being joined to form front seam 20, and the upper ends of the body-encircling portions 10 and 30 being anchored together along the edge 10c. Further, in my construction as exemplified in this embodiment, the lower edge portion 32 of the outer body-encircling portion 30 is upwardly, shallowly concave in the rear of the garment 1 and there extends above the rear lower edge 10d of the inner body-encircling portion 10. The garment is proportional and sized to fit the wearer, in the usual manner, the aforesaid rear edge portion 32 being positioned, shaped and proportioned to locate supportingly against the bottom of the buttocks of the wearer.

Further in accordance with this embodiment, the lower edges 30d and 10d of the body-encircling portions 30 and 10 register and are secured together at the respective points 28 intermediate the front center and sides of garment 1 and are otherwise entirely free of each other. The inner body-encircling portion or panel 10 has an edge 11, 11 extending upwardly from each said point 28 and then curving concavely until meeting the front seam 20, and positioned, shaped and proportioned in the fitted and proportioned garment so as to extend supportingly over and against the abdomen of the wearer. Finally, the hose supporters are secured to the garment in such a way as not to interfere with the support function of the edge 11, 11 and of the edge 32.

As particularly illustrative of the application of the invention, reference is made to FIGS. 8 and 9. Fig. 8 shows the manner in which the edges 11 are sized, shaped and proportioned to bear supportingly and compressively against the abdomen of the wearer, so as to exert upward and inward force upon the abdomen. FIG. 9 shows the manner in which the edge 32 exerts upward force against the bottom of the buttocks, so as to compress the buttocks. It has been found that the garment is particularly comfortable to wear, while at the same time trim in appearance and providing highly effective and slimming support to the abdomen and buttocks. Such support, however, still leaves panels available for the further support of hosiery through the hose supporters 2.

*Second embodiment*

In this embodiment, the foundation garment is in the form of a panty girdle 5 having an inner panel or body-encircling portion 40 and an outer panel or body-encircling portion 79. These portions or panels are made of any suitable conventional two-way stretch material.

As shown in FIGS. 12 and 13, the inner and outer body-encircling portions 40 and 70 are formed from blanks of substantially the same overall configuration and shape. That is, when the two blanks are superposed, as shown in these views, their downwardly, outwardly inclined side edges, which may be considered to extend generally vertically, are in registration. In other words, the vertical edge 40a of the blank of body-encircling panel or portion 40 registers with the corresponding edge 70a of the blank of body-encircling portion or panel 70. Similarly, the other vertical edge 40b of the blank of panel or body-encircling portion 40 registers with the other vertical edge 70b of the blank of body-encircling portion or panel 70. In order to form the garment, the edges 70a and 40a one the one hand, and 70b and 40b on the other hand, are brought together at the front of the garment and stitched together along their entire length to form a front seam 80. Without detailed showing it will be apparent that the fabric edges on either side of the seam may be reinforced as shown somewhat diagrammatically at 81 in FIG. 14. In blank form, the upper ends of the edges 40a and 70a coincide, and the upper ends of edges 40b and 70b coincide. However, the upper edge 40c of the inner panel or body-encircling portion 40 is located below the level of the upper edge 70c of the outer body-encircling portion or panel 70.

Accordingly, this relationship applies in the stitched form of the garment shown in FIGS. 10 and 11. That is, the edge 40c is cut out, to any suitable shape such as that shown in FIG. 12, to produce any suitable decorative effect when secured by stitching 82 to the outer panel or body-encircling portion 70. The upper end of the outer body-encircling portion 70 may be reinforced on its inner face by band 83 (FIG. 14).

The front seam 80 extends from the upper end of the garment only to the points 101 of the edges 70a and 70b. Below these points, the side edges of the blank 70 are inwardly offset at 102 and then continue downwardly at 103 to the bottom of the blank.

For convenience, the side edges 86 shown in the flattened condition of the garment, with seam 80 centered on the rear of the garment, will be defined as the side edges of garment 5. These edges 86 are downwardly, outwardly divergent in the usual manner.

At the front of the garment, the bottom edge 40d of the inner panel or body-encircling portion 40 terminates, adjacent the respective side edges 86, at respective points 87. However, the bottom edge 70d of outer panel or body-encircling portion 70 extends fairly straight across the front of the garment, from each point 27, to the center of the garment. The bottom edges 40d and 70d are secured together by stitching 88 (FIG. 14) at the points 87, said bottom edges being otherwise completely free of each other, except in the rear center of the garment.

From each point 87, inner panel or body-encircling portion 40 has an arcuate edge 41 which extends generally upwardly to the point 42, points 42 being the bottom ends of the respective edges 40a and 40b. These edges 41, accordingly, connect with the front seam 80 at a level approximately at the point marked 83, located considerably above the bottom end of seam 80. More specifically, each such edge 41 is concave and has a lower portion 41a which extends generally upwardly and somewhat inwardly from point 87. The edge portion 41a is very shallowly, outwardly concave, and merges smoothly at its upper end with an edge portion 41b which is downwardly concave with a much smaller radius of curvature than the edge 41a. The edge portion 41b extends to the point 42. As will be discussed in somewhat more detail below, when the garment 5 is worn, the edge 70d extends generally below the level of support of the abdomen, while the two edges 41 extend supportingly across the abdomen.

At the rear of garment 5, the lower edge 40d of inner panel or body-encircling portion 40 extends generally straight across the rear of the wearer. The lower edge 70d of the outer panel or body-encircling portion 70 approximately coincides with edge 40d in the side zones of the garment, extending from the respective points 87 outwardly around the side edges 86. Between the side edges 86, the edge 70d has a portion 71 which is scooped and generally concave. At its uppermost point 72, located at the rear center of garment 5, the edge 71 is located well above the edge 40d. This scooped portion is relatively shallow. However, as will be explained in more detail below, when garment 5 is worn, edge 40d is located generally below the zone of effective buttocks support while the edge 71 is positioned to press supportingly against the lower part of the buttocks. At the point 72, the panel 70 is provided with a rear central notch 72 which extends upwardly. The upper end of notch 73 is on a level with the offsets 102 which combine to serve as the upper end of a notch whose sides are the edges 103 when the edges 70a and 70b are joined to form a seam. Furthermore, a notch 43 is formed in panel 40, this notch 43 extending outwardly from edge 40d in the center rear of the garment, to the level of the upper end of the notch 73. The garment is completed by diamond-shaped crotch insert 120 having a pair of adjacent edges 121 and a pair of adjacent edges 122.

In the stitched garment 5, two of the edges 121 and 122 are respectively secured to the notch edges 103 of the outer panel 70, and also to the edge 102, along seam 110. The other two crotch edges 121 and 122 are secured to the side and top edges of the notch 43 of inner panel 40, along seam 112. As a result, a pair of panty legs or leg-encircling portions 111 are defined on either side of the respective seams 110 and 112. Each leg 111 has a front panel which is part of the outer body-encircling portion 70, and a rear panel which is part of the inner body-encircling portion 40. The front and rear panels of each leg-encircling portion 111 are only connected at the points 87, by stitching 88. Accordingly, when the wearer is seated, there is no binding at the thighs, and when the wearer is walking, there is considerable freedom of movement.

The crotch insert 120 may also be made of two-way stretch material, although lighter than the material of the main panels. The seams 110 and 112 may be reinforced by binding 115. The bottom edge of the outer panel 70 may be reinforced by binding 116. The bottom edge of the inner panel 40 may be reinforced by binding 118.

The garment is completed by conventional hose supporters 99, as shown in FIG. 14. FIGS. 10 and 11 show the attachment zones 98 for such hose supporters, four being shown. Specifically, there are pairs of front and rear hose supporters, the rear pair of hose supporters being connected to the inner panel 40 and the front pair of hose supporters being secured to the outer panel 70. Put in other terms, at the rear of the garment, where the special buttocks support is provided by the edge portion 71 of the outer panel 70, the hose supporters are secured to the inner panel or body-encircling portion 40. Conversely, at the front of the garment, where the main abdomen support function is accomplished by the edge portions 41 of the inner panel or body-encircling portion 40, the hose supporters are secured to the outer panel or body-encircling portion 70. The hose supporters are substantially the same as the first embodiment.

Finally, for convenience, the outer panel edge 71 may be secured, at each side of the notch 73, or in other words at the points 72, to the seam 112, at approximately the top thereof, as shown in FIG. 11. Such anchoring of the outer panel to the inner panel does not interfere with the support function of the edge 71, nor with the freedom of the panty legs.

From the foregoing, it will be apparent that I have provided a foundation garment 5 of two-way stretch material comprising an outer body-encircling portion 70 superposed upon an inner body-encircling portion 40, these body-encircling portions 40 and 70, along the vertical edges 40a, 40b and 70a, 70b, being joined to form front seam 80, and the upper ends of the body-encircling portions 40 and 70 being anchored together along the edge 40c. Further, in my construction as exemplified in this embodiment, the lower edge portion 71 of the outer body-encircling portion 70 is upwardly, shallowly concave in the rear of the garment 5 and there extends above the rear lower edge 40d of the inner body-encircling portion 40. The garment is proportioned and sized to fit the wearer, in the usual manner, the aforesaid rear edge portion 71b positioned, shaped and proportioned to locate supportingly against the bottom of the buttocks of the wearer. Finally, the panels are appropriately split and completed by crotch piece to form a pair of panty legs, the front panel of each panty leg being part of the outer body-encircling portion and the inner panel of each panty leg being part of the inner body-encircling portion. The hose supporters are respectively secured to the front and rear panels of each of the body-encircling leg portions of the garment. Accordingly, the support of the hose supporters is provided by panels which do not bear the main burden of support upon the abdomen and buttocks of the wearer.

In walking, the inner and outer panels lie flat against each other at the sides of the garment. On the other hand, in sitting, the inner panel pulls away from the outer panel at the sides, in direction so as to relax the pressure of the inner panel against the abdomen and prevent the inner panel from "cutting" the abdomen.

While I have disclosed preferred embodiments of the invention and have indicated various possible changes, omissions and additions therein, it will be apparent that various other changes, omissions and additions are possible without departing from the scope and spirit of the invention.

What is claimed is:

1. A foundation garment of two-way stretch material comprising an outer tubular portion and an inner tubular portion within said outer tubular portion, said tubular portions, along the vertical edges thereof, being joined to form a front seam, the upper ends of said tubular portions being anchored together, the lower edge of said outer tubular portion being upwardly shallowly concave in the rear of the garment and there extending above the rear lower edge of said inner tubular portion and positioned, shaped and proportioned to locate supportingly against the bottom of the wearer's buttocks, the lower edges of said tubular portions registering and being secured together at respective points intermediate the front center and sides of the garment and being otherwise completely unsecured to each other, said inner tubular portion having an edge extending upwardly from each said point and then curving concavely until meeting the front seam, the edges of said inner tubular portion between said points and said front seam positioned, shaped and proportioned to extend supportingly against the wearer's abdomen.

2. A foundation garment according to claim 1, said garment being a panty, said inner tubular portion being vertically split in the rear center from its lower edge to the rear lower edge of said outer tubular portion to from rear leg panels on either side of the split, the rear lower edge of said outer tubular portion secured to said inner tubular portion at the upper end of the split, said front seam terminating below said lower edge of said inner tubular portion and above the lower edge of said outer tubular portion, the vertical edges of said outer tubular portion being thereby separate from each other below said front seam and said outer tubular portion having front leg panels extending outwardly from its separate vertical edge portions, the respective front and rear leg panels being joined to each other along their inner edges to form leg portions of the garment.

3. A foundation garment of two-way stretch material comprising an outer tubular portion and an inner tubular portion within said outer tubular portion, said tubular portions, along the vertical edges thereof, being joined to form a front seam, the upper ends of said tubular portions being anchored together, the lower edge of said outer tubular portion being upwardly shallowly concave in the rear of the garment and there extending above the rear lower edge of said inner tubular portion and positioned, shaped and proportioned to locate supportingly against the bottom of the wearer's buttocks, the lower edges of said tubular portions registering and being secured together at respective points intermediate the front center and sides of the garment and being otherwise completely unsecured to each other, said inner tubular portion having an edge extending upwardly from each said point and then curving concavely until meeting the front seam, the edges of said inner tubular portion between said points and said front seam positioned, shaped and proportioned to extend supportingly against the wearer's abdomen, said garment having front and rear pairs of hose supporters secured to the bottom thereof, the front hose supporters being secured to said outer tubular portion, the rear hose supporters being secured to said inner tubular portion.

4. A foundation garment according to claim 1, said garment having front and rear pairs of hose supporters secured to the bottom thereof, the front hose supporters being secured to said outer tubular portion, the rear hose supporters being secured to said inner tubular portion.

5. A foundation garment according to claim 2, said garment having front and rear pairs of hose supporters secured to the bottom thereof, the front hose supporters being secured to said outer tubular portion, the rear hose supporters being secured to said inner tubular portion.

References Cited by the Examiner
UNITED STATES PATENTS

| | | | |
|---|---|---|---|
| 2,879,771 | 3/1959 | Bell | 128—546 |
| 3,011,496 | 12/1961 | Cousins | 128—546 |
| 3,095,881 | 7/1963 | Marino | 128—552 |

ADELE M. EAGER, *Primary Examiner.*